US006137600A

United States Patent [19]

Sakurai et al.

[11] Patent Number: 6,137,600
[45] Date of Patent: Oct. 24, 2000

[54] RECORDING APPARATUS

[75] Inventors: Kenji Sakurai, Tokyo; Mitsuhiro Mukasa, Kawasaki, both of Japan

[73] Assignee: Canon Aptex Kabushiki Kaisha, Tokyo, Japan

[21] Appl. No.: 09/086,309

[22] Filed: May 27, 1998

[30] Foreign Application Priority Data

May 30, 1997 [JP] Japan .................................... 9-142779

[51] Int. Cl.7 ........................................................ H04N 1/21

[52] U.S. Cl. ........................... 358/498; 358/401; 399/372

[58] Field of Search ..................................... 358/296, 498, 358/496, 474; 399/367, 371, 372; 271/248, 274, 10.11, 10.01, 150, 4.104

[56] References Cited

U.S. PATENT DOCUMENTS

| | | | |
|---|---|---|---|
| 5,091,754 | 2/1992 | Abe et al. | 355/317 |
| 5,183,347 | 2/1993 | Higuchi et al. | 271/185 |
| 5,298,959 | 3/1994 | Saito et al. | 355/319 |
| 5,499,091 | 3/1996 | Kasiwabara et al. | 355/319 |
| 5,725,319 | 3/1998 | Saito et al. | 271/248 |
| 5,749,570 | 5/1998 | Iwata et al. | 271/10.13 |
| 5,918,873 | 7/1999 | Saito et al. | 271/118 |
| 5,974,290 | 10/1999 | Inoue | 271/301 |

FOREIGN PATENT DOCUMENTS

| | | |
|---|---|---|
| 0 341 418 | 11/1989 | European Pat. Off. . |
| 0 556 944 | 8/1993 | European Pat. Off. . |
| 8-259101 | 10/1996 | Japan . |

OTHER PUBLICATIONS

European Search Report.

*Primary Examiner*—Jerome Grant, II
*Attorney, Agent, or Firm*—Fitzpatrick, Cella, Harper & Scinto

[57] ABSTRACT

In a recording apparatus for stably conveying a recording medium to a recording portion by a convey belt, the recording medium is passed through a nip of a pair of separation supply rollers and enters into a nip between a convey belt and a driven roller and thereafter is conveyed by the convey belt to a recording portion. When a leading end of the recording medium is detected by a recording medium detect sensor, the supply roller is disengaged from the separation roller, so that the convey belt is not subjected to the influence of the pair of separation supply rollers via the recording medium and when a trailing end of the recording medium is detected by a recording medium detect sensor, the driven roller is disengaged from the convey belt, so that the recording medium is not subjected to conveyance resistance from the driven roller.

11 Claims, 12 Drawing Sheets

RECORDING APPARATUS

BACKGROUND OF THE INVENTION

1. Field of the Invention

The present invention relates to a recording apparatus for recording an image on a recording medium supplied one by one.

2. Related Background Art

FIG. 10 shows a conventional color recording apparatus of an ink jet recording type. The recording apparatus serves to record a color image on a small size recording medium such as a visiting card or a post card.

The recording apparatus includes a sheet supply portion 200 for supplying recording media S one by one to a main body 100 of the recording apparatus, a recording convey portion 300 for conveying the recording medium S supplied from the sheet supply portion 200 at a predetermined speed in a horizontal direction, an image recording portion 400 for recording an image on the recording medium S being conveyed by the recording convey portion 300, and a discharge stacking portion 500 for discharging and stacking the recording media S on which the images were recorded in the image recording portion 400.

The sheet supply portion 200 comprises a sheet supply tray 201, a pick-up roller 202, a separation pad 203, a pair of separation supply rollers 204, 205, and a shutter 206. The pick-up roller 202 is rotated in a clockwise direction to feed out the uppermost recording media S from those stacked on the sheet supply tray 201. The sheet supply tray 201 is lifted by a predetermined amount whenever a predetermined number of recording media S are fed out, so that the uppermost recording medium S is contacted with the pick-up roller 202 with predetermined pressure.

The recording media S fed out by the pick-up roller 202 are pre-separated by the inclined separation pad 203 and then are separated and supplied one by one by the pair of separation supply rollers 204, 205.

The supply roller 205 is rotated in a clockwise direction. The separation roller 204 is normally rotated in an anti-clockwise direction. However, if a plurality of recording media S are supplied in a nip between the supply roller 205 and the separation roller 204, the separation roller is rotated in a clockwise direction by the action of a torque limiter (not shown). Skew-feed of the recording medium S fed by the pair of separation supply rollers 204, 205 is corrected by abutting the recording medium against the shutter a tip end of which blocks a sheet path. After the skew-feed of the recording medium is corrected, the shutter 206 is retarded from the sheet path.

The recording convey portion 300 includes an endless convey belt 301, a driven roller 302 cooperating with the convey belt 301 to pinch the recording medium S therebetween at a most upstream end of the convey belt, and a plurality of spur wheels 303 to 307 for holding down the recording medium S on the convey belt 301 at a downstream area of the driven roller 302. The convey belt 301 is mounted and wound around a drive roller 308 rotated in an anti-clockwise direction and a driven roller 308 and extends in a horizontal direction. The driven roller 302 is opposed to the drive roller 308 and is biased toward the drive roller 308 by a biasing means (not shown) such as a spring so that the driven roller 302 is contacted with the convey belt 301 with predetermined pressure.

The leading end of the recording sheet S the skew-feed of which was corrected by the shutter 206 enters into a nip between the convey belt 301 rotated in the anti-clockwise direction and the driven roller 302 rotatingly driven by the rotation of the convey belt 301. The recording medium S is conveyed onto the convey belt 301 while being pinched between the convey belt 301 and the driven roller 302. The recording medium S on the convey belt 301 rotated in the anti-clockwise direction is conveyed toward a downstream side while being held down by the spur wheels 303 to 307 rotatingly driven by the rotation of the convey belt 301.

The image recording portion 400 includes a plurality of ink jet recording heads 400B, 400C, 400M and 400Y spaced apart from each other by a predetermined distance along a recording medium conveying direction. The recording head 400B serves to discharge black color ink, recording head 400C serves to discharge cyan color ink, recording head 400M serves to discharge magenta color ink and recording head 400Y serves to discharge yellow color ink.

When the recording medium S conveyed by the convey belt 301 reaches the recording head 400B, the recording head 400B discharges the black color ink, thereby recording a black color image. Then, when the recording medium S reaches the recording head 400C, the recording head 400C discharges the cyan color ink, thereby recording a cyan color image. Then, when the recording medium S reaches the recording head 400M, the recording head 400M discharges the magenta color ink, thereby recording a magenta color image. Then, when the recording medium S reaches the recording head 400Y, the recording head 400Y discharges the yellow color ink, thereby recording an yellow color image.

The discharge stacking portion 500 includes a sheet discharge tray 501, a first discharge roller 502, and a second discharge roller 503. The recording medium S on which the image was recorded is discharged out of the apparatus while being pinched between the first discharge roller 502 and a spurred roller 504. The recording medium S discharged out of the apparatus is discharged onto the sheet discharge tray 501 while being pinched between the second discharge roller 503 and a spurred roller 505.

However, in the above-mentioned conventional recording apparatus, since (1) the recording medium S is conveyed onto the convey belt 301 while being pinched between the convey belt 301 and the driven roller 302, and (2) the recording medium S is fed to the convey belt 301 by the pair of separation supply rollers 204, 205 pinching the recording medium S, the following problems arose.

That is to say, firstly, as shown in FIG. 11, when the recording medium S-1 supplied by the pair of separation supply rollers 204, 205 strides over between the pair of separation supply rollers 204, 205 and the convey belt 301, the rotations of the pair of separation supply rollers 204, 205 influence upon the rotation of the convey belt 301 through the recording medium S-1. Thus, it is very difficult to stably convey the recording medium S-2 being conveyed by the convey belt 301 and being recorded, at the predetermined speed, thereby reducing the recording quality.

Secondly, as shown in FIG. 12, the recording medium S-2 being conveyed by the convey belt 301 and being recorded is subjected to conveyance resistance at a time when a trail end of the recording medium leaves the nip between the convey belt 301 and the driven roller 302, thereby worsening the recording quality.

The above first and second problems are noticeable particularly when the recording medium S is a thick sheet having a thickness of 200 microns or more.

SUMMARY OF THE INVENTION

The present invention aims to eliminate the above-mentioned conventional drawbacks, and an object of the present invention is to provide a recording apparatus in which a recording medium can be stably conveyed to a recording portion.

The present invention relates to a recording apparatus having a first recording medium conveying means for conveying the recording medium received in a pinched condition to the recording portion in a pinched condition, and a second recording medium conveying means for conveying the recording medium to the first recording medium conveying means in a born condition.

To achieve the above object, according to the present invention, there is provided a recording apparatus wherein, when a leading end of a recording medium conveyed by the second recording medium conveying means is passed through a pinching portion of the first recording medium conveying means, a recording medium pinching condition of the second recording medium conveying means is released.

DETAILED DESCRIPTION OF THE PREFERRED EMBODIMENTS

The present invention will now be fully explained in connection with embodiments thereof with reference to the accompanying drawings.

<First Embodiment>

Figure 1:
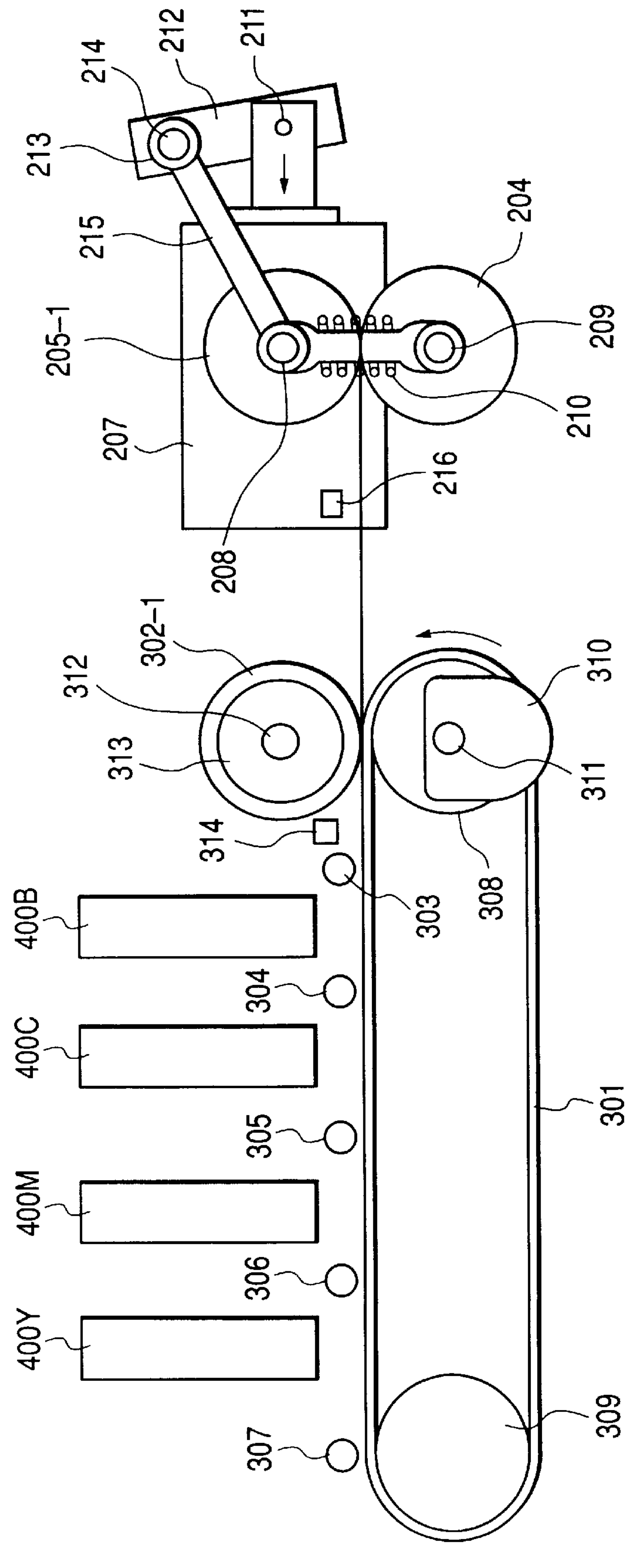
FIG. 1 is a sectional view showing a main portion of a color recording apparatus to which the present invention is applied.
Figure 5:
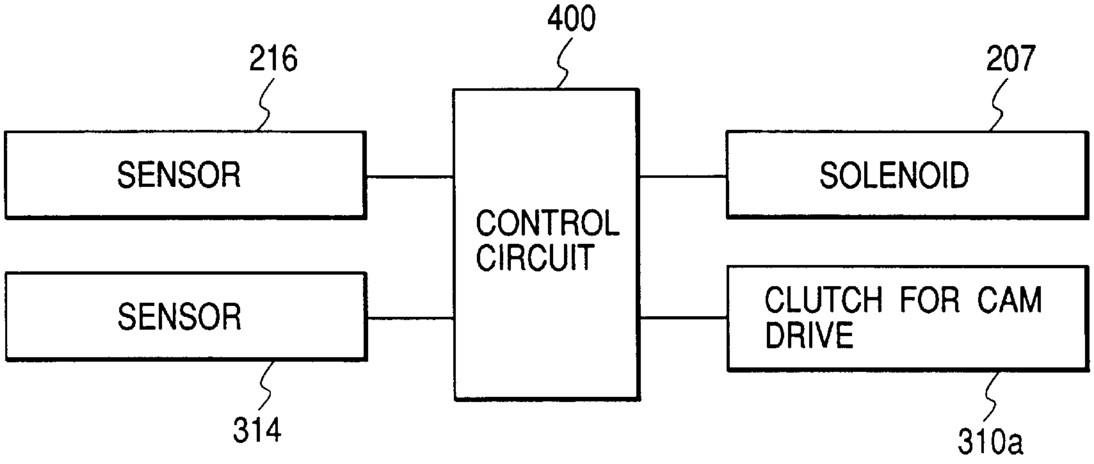
FIG. 5 is a control block diagram of the color recording apparatus.
Figure 9:
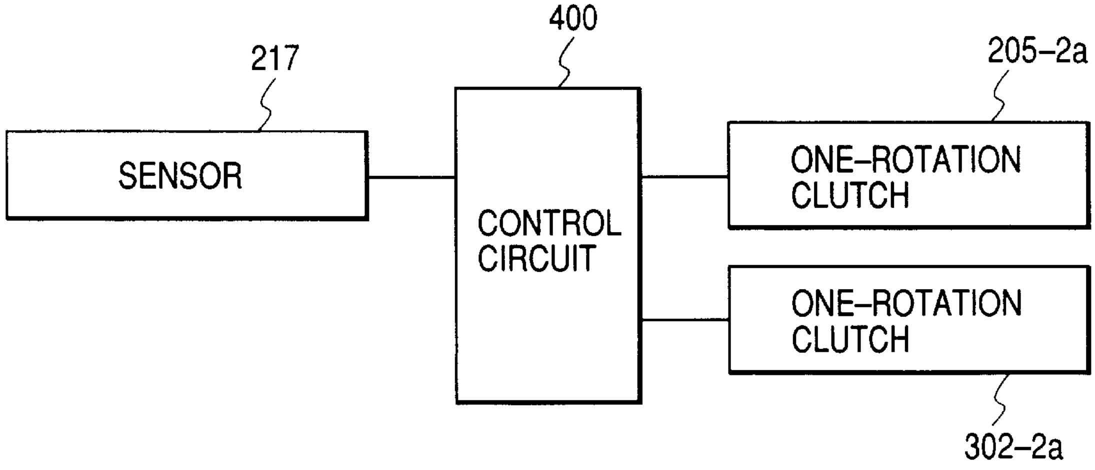
FIG. 9 is a control block diagram of the color recording apparatus.
Figure 10:
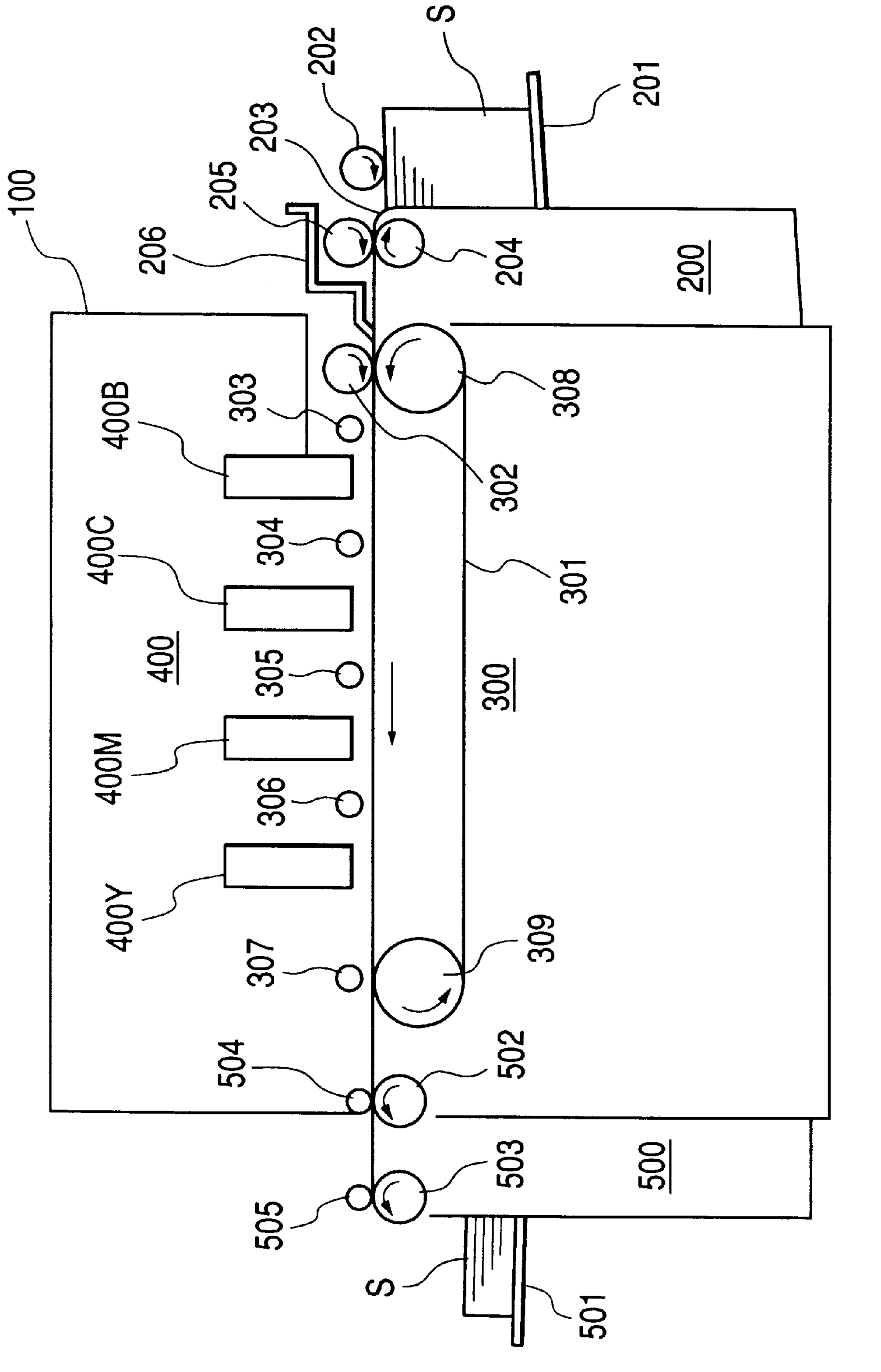
FIG. 10 is a sectional view of a conventional color recording apparatus.
Figure 11:
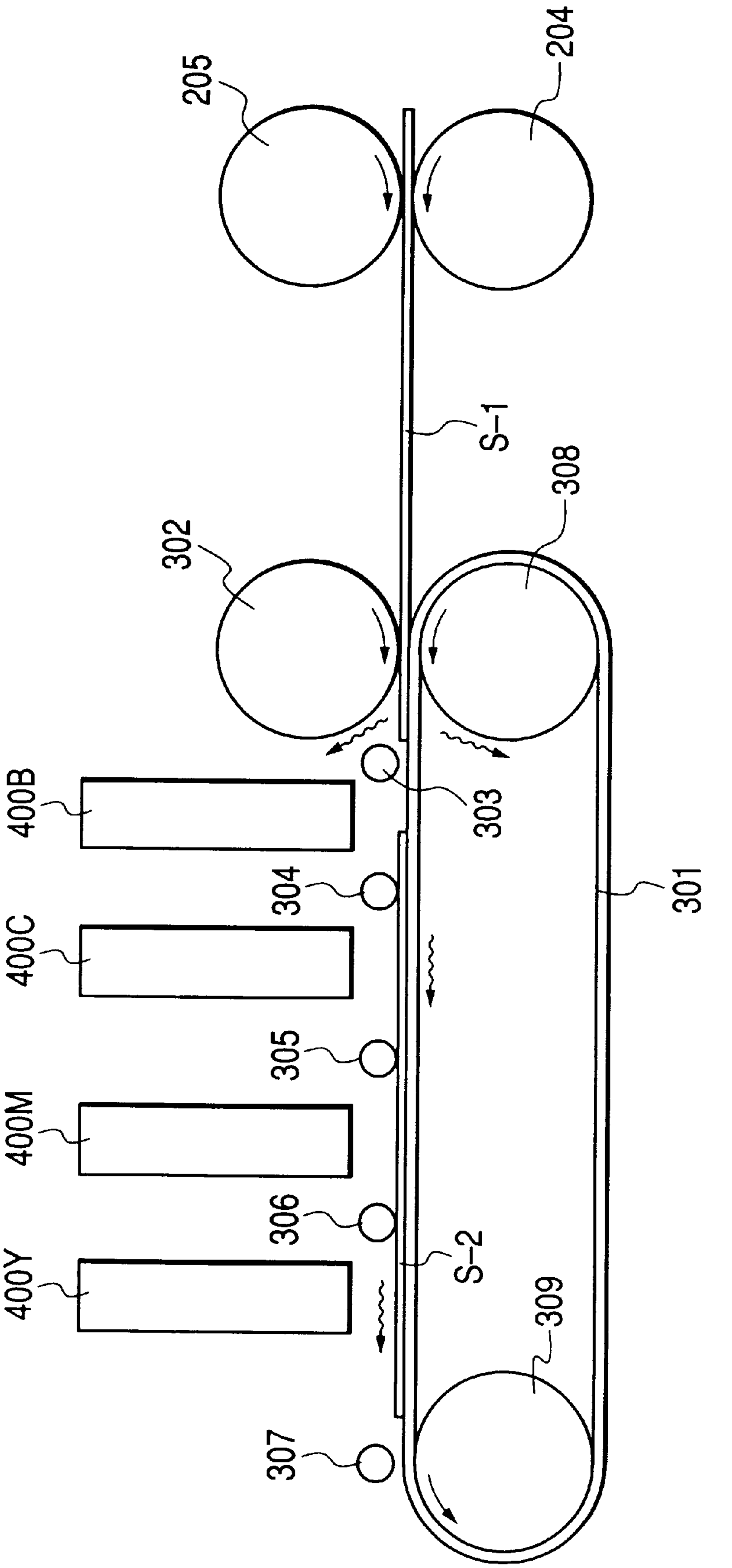
FIGS. 11 and 12 are sectional views for explaining problems of the conventional color recording apparatus.
Figure 12:
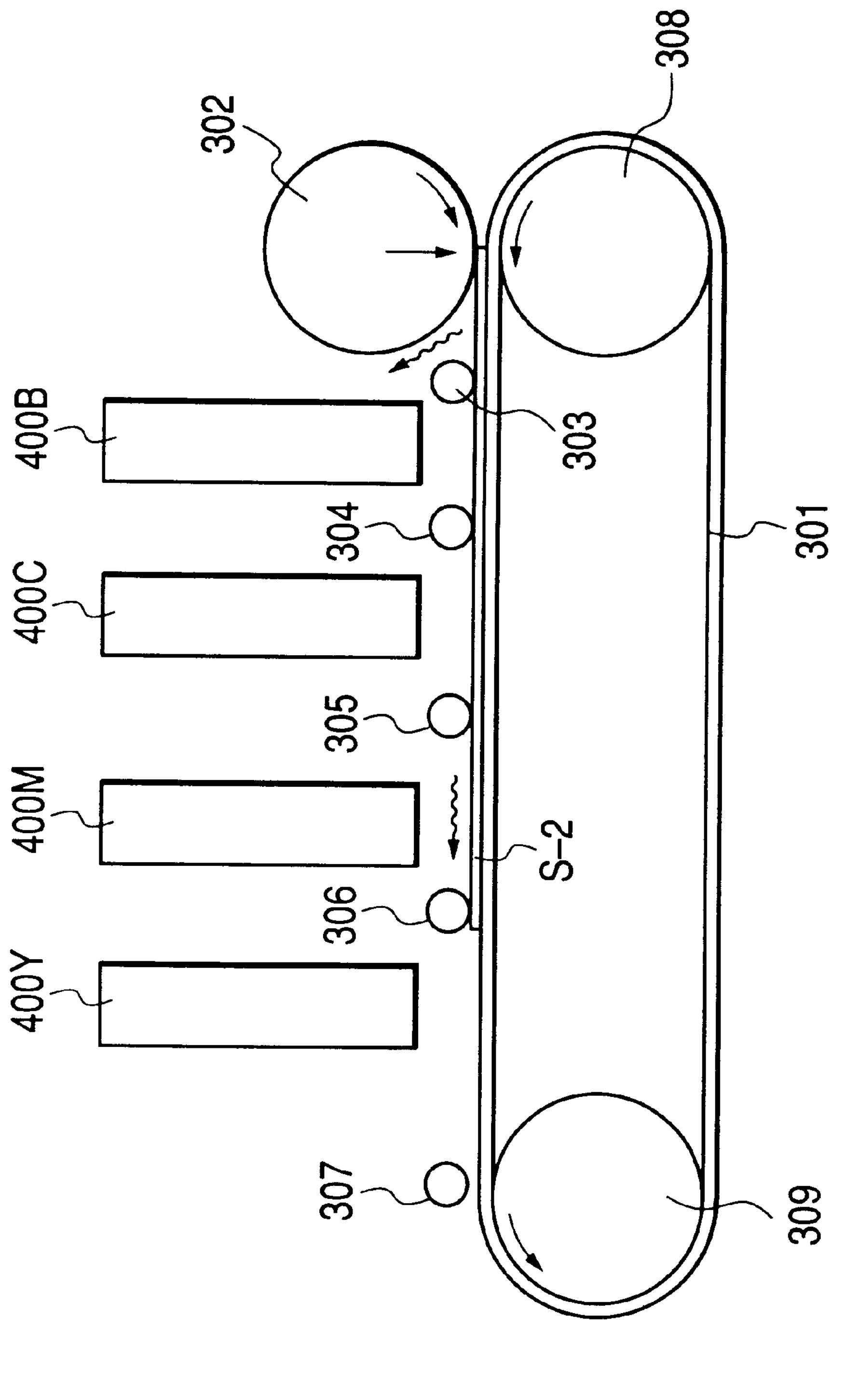

FIG. 1 shows a main portion of a recording apparatus to which the present invention is applied and which is similar to the recording apparatus as shown in FIG. 10. Further, FIG. 5 shows a control block diagram.

In this recording apparatus, a recording medium pinching condition between a separation roller 204 and a supply roller 205-1 which serve to convey a recording medium S while pinching the recording medium therebetween and a recording medium pinching condition between a convey belt 301 and a driven roller 302-1 which serve to convey a recording medium S while pinching the recording medium therebetween can be released. In a convey portion including the separation roller 204 and the supply roller 205-1, the recording medium pinching condition is released by disengaging the supply roller 205-1 from the separation roller 204. In a convey portion including the convey belt 301 and the driven roller 302-1, the recording medium pinching condition is released by disengaging the driven roller 302-1 from the convey belt 301.

The supply roller (roller A) 205-1 is disengaged from the separation roller (roller B) 204 by means of a solenoid 207. The supply roller 205-1 can be shifted in an up-and-down direction and is biased toward the separation roller 204 by an endless coil spring 210 mounted around a bearing 208 of the supply roller 205-1 and a bearing 209 of the separation roller 204 so that the supply roller 205-1 is contacted with the separation roller 204 with predetermined pressure.

An iron core 211 of the solenoid 207 is connected to a rotary shaft 214 supported by a bearing 213 at a predetermined position via a link 212. The link 212 is supported for rotation with respect to the iron core 211 and is fixed with respect to the rotary shaft 214 not to be rotated relative to the latter. A lever 215 for transmitting movement of the rotary shaft 214 to the supply roller 205-1 is disposed between the rotary shaft 214 and the bearing 208. One end of the lever 215 is fixed to the rotary shaft 214 and the other end of the lever is fixed to the bearing 208.

FIG. 1 shows a condition that the solenoid 207 is turned OFF. In this condition, the supply roller 205-1 is contacted with the separation roller 204 by the biasing force of the coil spring 210 so that the iron core 211 of the solenoid 207 is extended.

Figure 3:
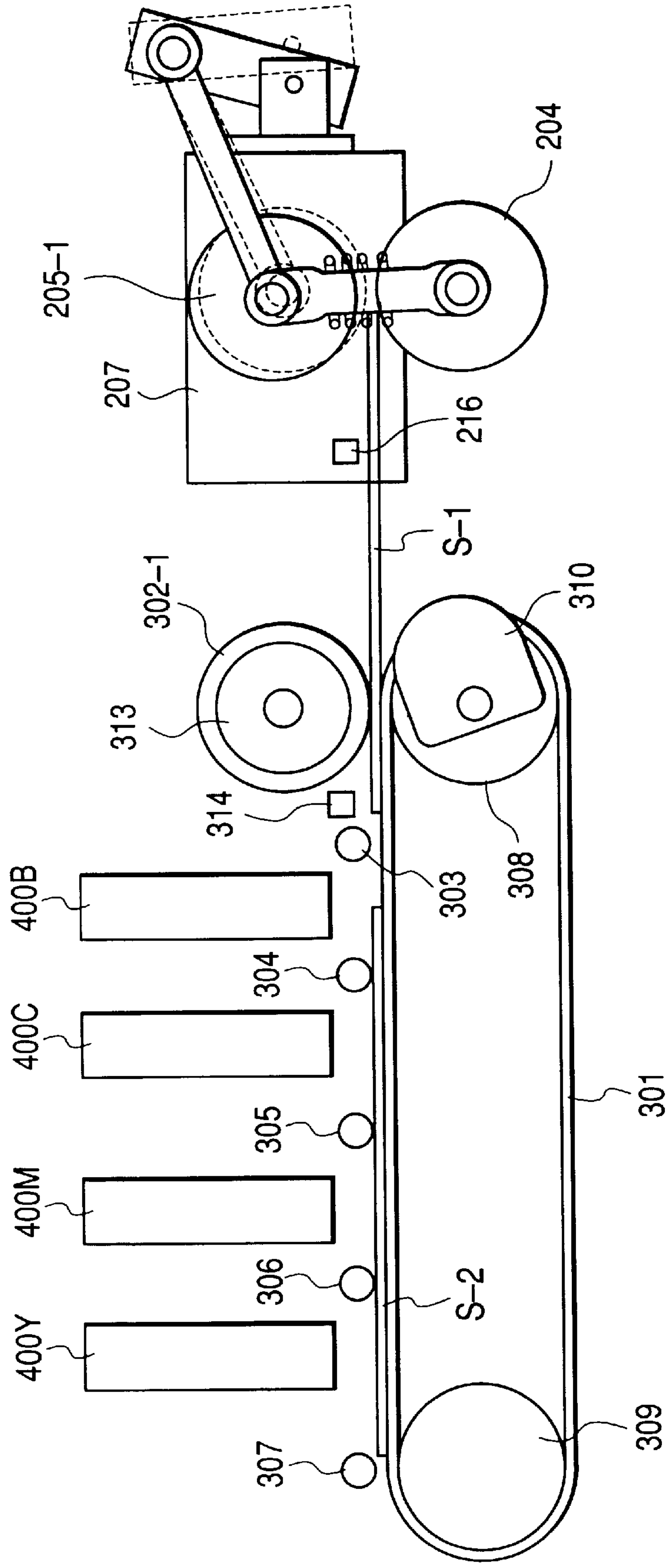
FIGS. 3 and 4 are sectional views for explaining an operation of the color recording apparatus.

When the solenoid 207 is turned ON, the iron core 211 is attracted to retract the solenoid. As a result, the rotary shaft 214 is rotated in a clockwise direction to lift the supply roller 205-1 by the lever 215, thereby disengaging the supply roller from the separation roller 204. In this way, the recording medium pinching condition between the separation roller 204 and the supply roller 205-1 is released. FIG. 3 shows a condition that the solenoid 207 is turned ON.

Figure 2:
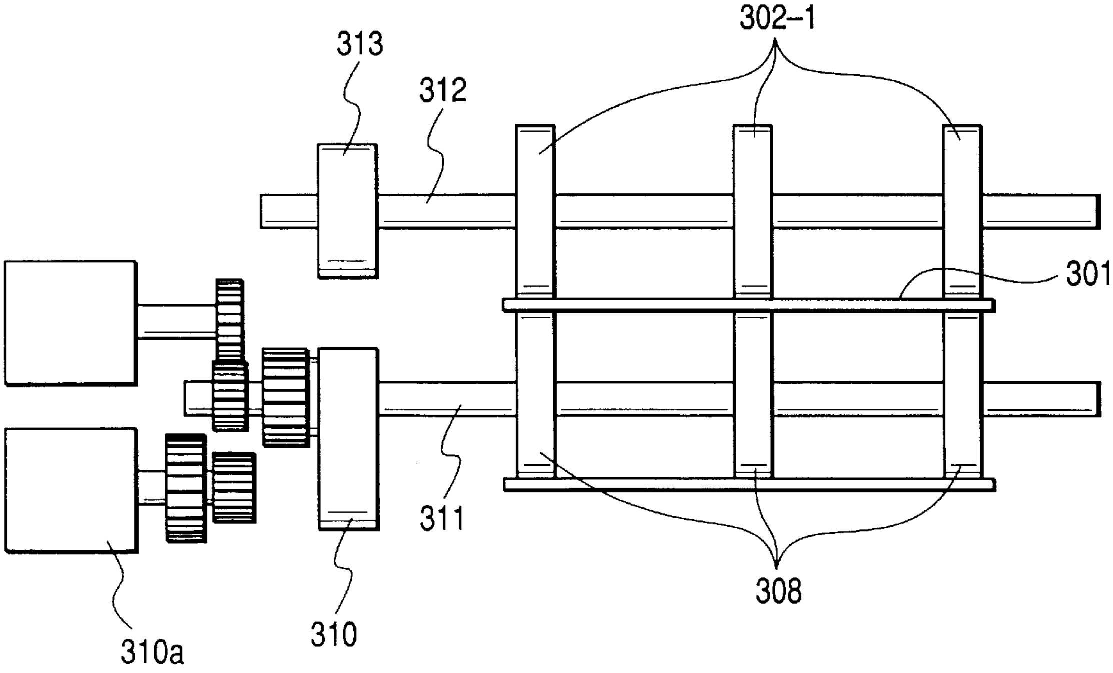
FIG. 2 is a front view of a recording convey portion of the color recording apparatus, looked at from a sheet supply side.

The driven roller (roller D) 302-1 is disengaged from the convey belt by a dome-shaped cam 310 attached to one lateral end of a drive roller shaft 311 (refer to FIG. 2). A driving force of the shaft 311 is transmitted to the cam 310 through a cam drive clutch **310*a* (FIG. 2). A sub-roller 313 is attached to a driven roller shaft 312 in an opposed relation to the cam 310**.

FIG. 1 shows a condition that the cam drive clutch **310*a* is in an OFF condition, and, in this condition, the cam 310 is in a stand-by condition directing downwardly (six o'clock position). When the cam drive clutch 310*a* is turned ON, the cam 310 to which the driving force of the shaft 311 was transmitted is rotated in an anti-clockwise direction to gradually lift the sub-roller 313. When the cam 310** is rotated by 180 degrees to occupy an upwardly directed position (twelve o'clock position), the cam drive clutch is turned OFF.

Figure 4:
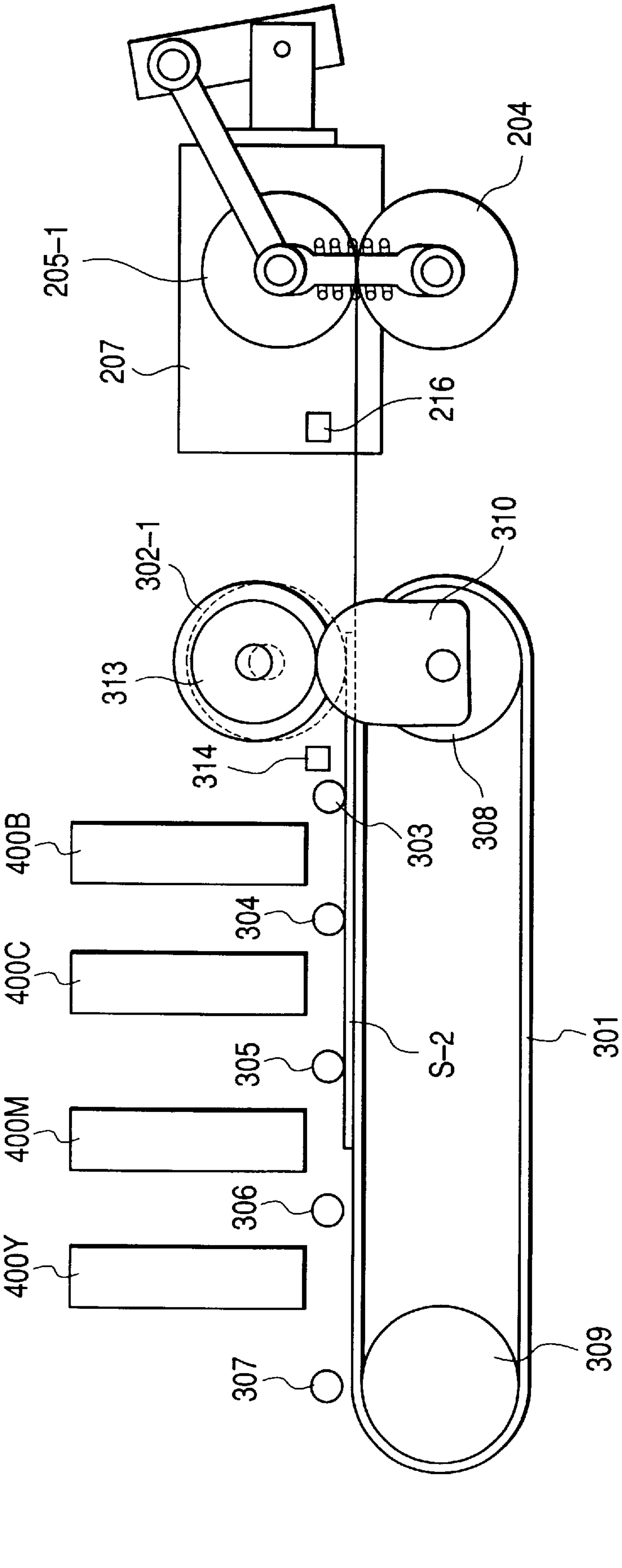

As a result, the driven roller 302-1 is disengaged from the convey belt 301, thereby releasing the recording medium pinching condition between the convey belt 301 and the driven roller 302-1. FIG. 4 shows a condition that the cam drive clutch **310*a*** is turned ON.

In the recording apparatus, recording medium detect sensors (optical sensors) 216, 314 for detecting the recording medium S are disposed between the nip of the separation roller 204/supply roller 205-1 and the nip of the convey belt 301/driven roller 302-1 and immediately at a downstream side of the nip of the convey belt 301/driven roller 302-1, respectively.

Next, an operation of the recording apparatus will be explained with reference to FIGS. 1, 3 and 4.

At a point when the supplying of the recording medium S is started, the solenoid 207 is turned OFF and the cam drive clutch 310*a* is turned OFF, with the result that, as shown in FIG. 1, the supply roller 205-1 is contacted with the separation roller 204 to form the nip therebetween and the driven roller 302-1 is contacted with the convey belt 301 to form the nip therebetween. The recording medium fed out from the sheet supply tray 201 passes through the nip between the separation roller 204 and the supply roller 205-1 and then passes through the nip between the convey belt 301 and the driven roller 302-1.

In the recording apparatus, as shown in FIG. 3, when the leading end of the recording medium passed through the nip between the convey belt 301 and the driven roller 302-1 is detected by the recording medium detect sensor (recording medium detect means A) 314, a control circuit 400 turns the solenoid 207 ON, thereby disengaging the supply roller 205-1 from the separation roller 204.

As a result, the convey belt 301 is not subjected to the influence of the pair of separation supply rollers 204, 205-1 via the recording medium S-1, and, thus, the recording medium S-2 being conveyed by the convey belt 301 and being recorded is conveyed stably at a predetermined speed. Further, the trailing end of the recording medium S-1 is detected by the recording medium detect sensor (recording medium detect means B) 216, the control circuit 400 turns the solenoid 207 OFF and at the same time turns the cam drive clutch 310*a* ON for a predetermined time period.

FIG. 4 shows a condition when the predetermined time period is elapsed after the cam drive clutch 310*a* was turned ON. At this point, the cam 310 is stopped at the upwardly directing position, with the result that the driven roller 302-1 is disengaged from the convey belt 301. Further, at this point, the trailing end of the recording medium S-2 being conveyed by the convey belt 301 and being recorded is not yet passed through the nip between the convey belt 301 and the driven roller 302-1. Accordingly, when the trail end of the recording medium S-2 leaves the nip between the convey belt 301 and the driven roller 302-1, the recording medium is not subjected to the conveyance resistance from the driven roller 302-1.

At the time when the trail end of the recording medium S-2 is detected by the recording medium detect sensor 314, the control circuit 400 turns the cam drive clutch 310*a* ON for the predetermined time period. As a result, the cam 310 is rotated in the anti-clockwise direction up to the downwardly directing position (refer to FIG. 1), thereby contacting the driven roller 302-1 with the convey belt 301.

<Second Embodiment>

Figure 6A:
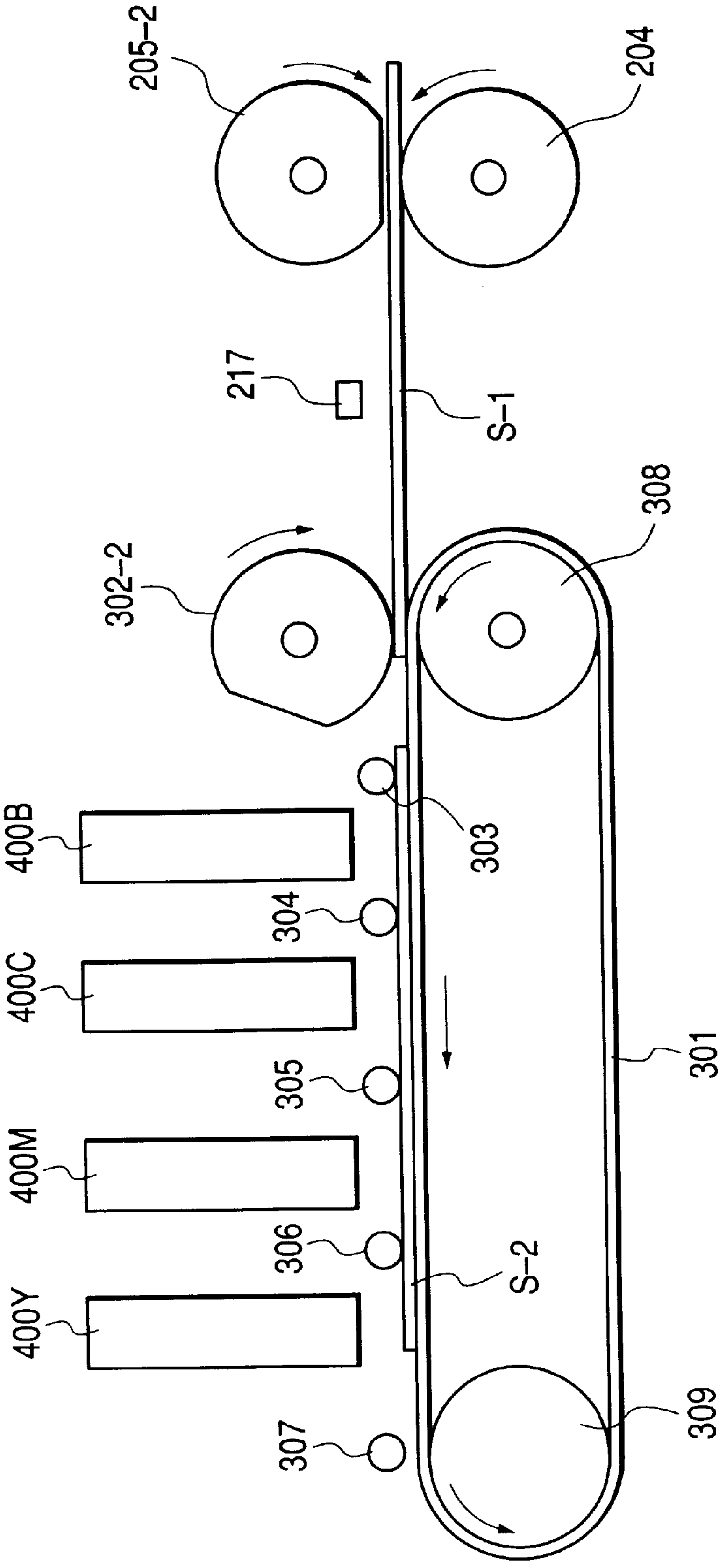
FIG. 6A is a sectional view showing a main portion of a color recording apparatus to which the present invention is applied and FIGS. 6B and 6C are front views thereof.

FIG. 6A shows a main portion of a recording apparatus to which the present invention is applied and which is similar to the recording apparatus as shown in FIG. 10.

In this recording apparatus, semi-circular or D-cut rollers each having a flat surface at a portion of the periphery thereof are used as a supply roller (roller C) 205-2 cooperating with a separation roller 204 to pinch and convey a recording medium S therebetween, and a driven roller (roller E) 302-2 cooperating with a convey belt 301 204 to pinch and convey a recording medium S therebetween. Among them, the driven roller 302-2 shaped as a cam having a radius gradually decreasing in an anti-clockwise direction. A driving force is transmitted to the supply roller 205-2 and the driven roller 302-2 through one revolution clutches 205-2*a*, 302-2*a*, respectively (refer to FIGS. 6B and 6C).

Further in this recording apparatus, a recording medium detect sensor (recording medium detect means C) 217 for detecting the recording medium S is disposed between a nip of the separation roller 204/supply roller 205-2 and a nip of the convey roller 301/driven roller 302-2.

Next, an operation of the recording apparatus will be explained with reference to FIGS. 6A to 6C, 7, 8 and 9.

The semi-circular supply roller 205-2 and the semi-circular driven roller 302-2 are in their stand-by conditions where the flat surfaces faces downwardly (becomes parallel with the recording medium). When the sheet supply is started, the one revolution clutch 205-2*a* (one revolution clutch A) is turned ON by a control circuit 400, thereby rotating the supply roller 205-2 in a clockwise direction. As a result, the recording medium fed out from a sheet supply tray 201 is passed through the nip between the separation roller 204 and the supply roller 205-2.

When a tip end of the recording medium S-1 passed through the nip between the separation roller 204 and the supply roller 205-2 is detected by the recording medium detect sensor 217, the one revolution clutch 302-2*a* (one revolution clutch B) is turned ON by the control circuit 400, thereby rotating the driven roller 302-2 in a clockwise direction. As a result, the leading end of the recording medium S-1 is passed through the nip between the convey belt 301 and the driven roller 302-2.

Figure 6B:
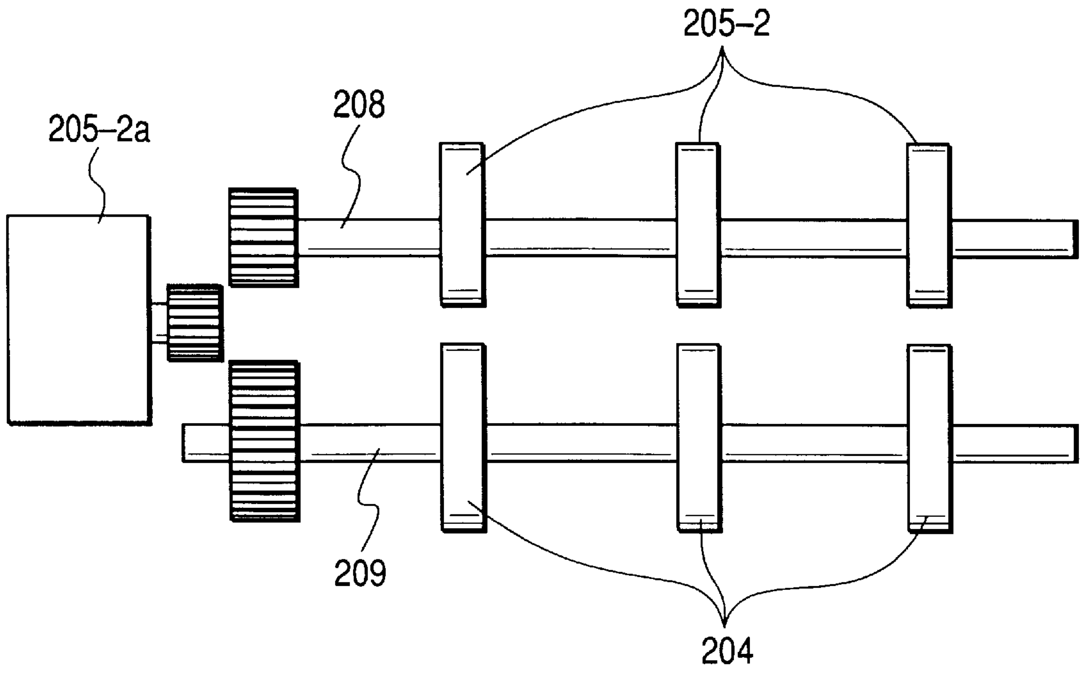
Figure 6C:
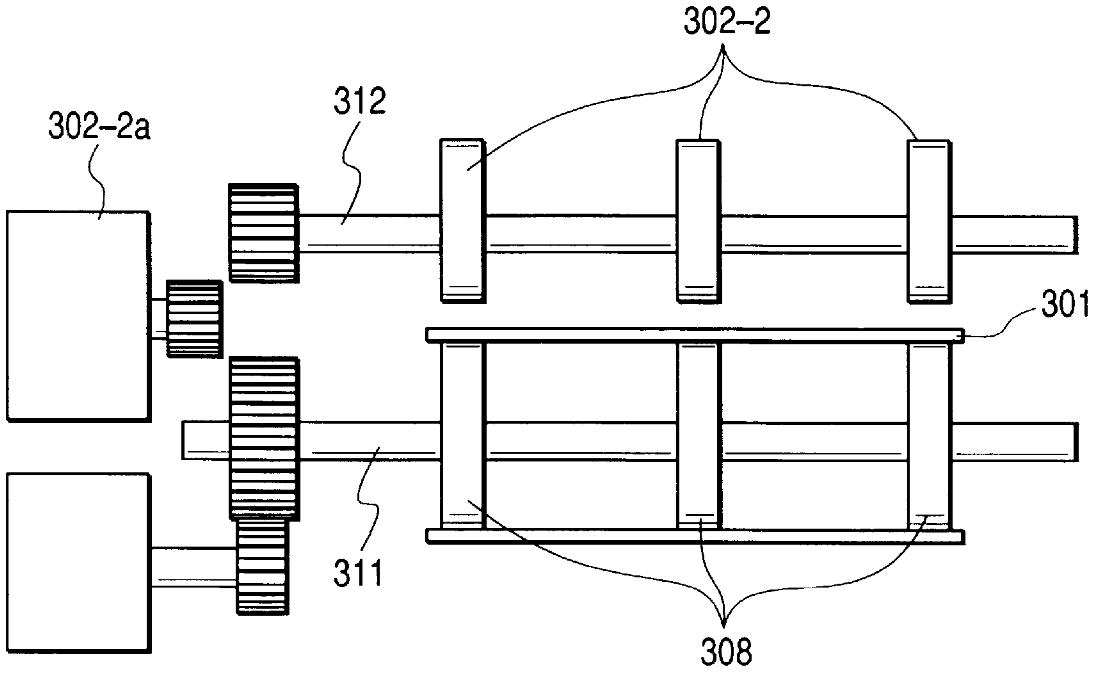

FIGS. 6A to 6C show conditions immediately after the leading end of the recording medium S-1 is passed through the nip between the convey belt 301 and the driven roller 302-2. In this condition, although the trailing end of the recording medium S-1 is not yet passed through the nip between the separation roller 204 and the supply roller 205-2, the supply roller 205-2 has already been rotated by one revolution to return to the stand-by condition. That is to say, the recording medium pinching condition between the separation roller 204 and the supply roller 205-2 has been released. Accordingly, the convey belt 301 is not subjected to the influence of the pair of separation supply rollers 204, 205-2 via the recording medium S-1, and, thus, the recording medium S-2 being conveyed by the convey belt 301 and being recorded is conveyed stably at a predetermined speed.

Figure 7:
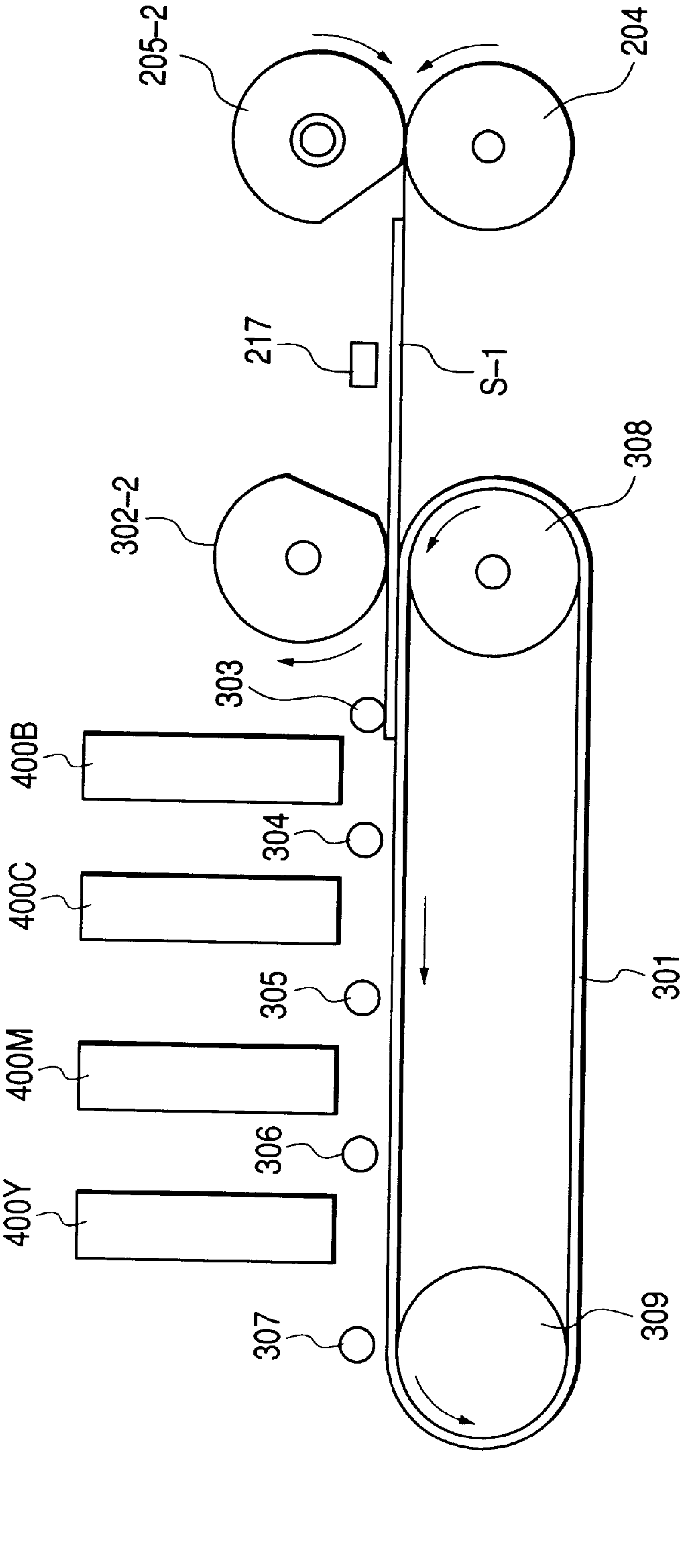
FIGS. 7 and 8 are sectional views for explaining an operation of the color recording apparatus.

FIG. 7 shows a condition immediately before one revolution of the driven roller 302-2 is completed. In this condition, the recording medium S-1 which starts to be conveyed by the convey belt 301 is held down by a spur wheel 303. Since the radius of the driven roller 302-2 is decreased as the driven roller is rotated, at the condition shown in FIG. 7, the driven roller 302-2 is contacted with the recording medium S-1 with weak pressure.

Figure 8:
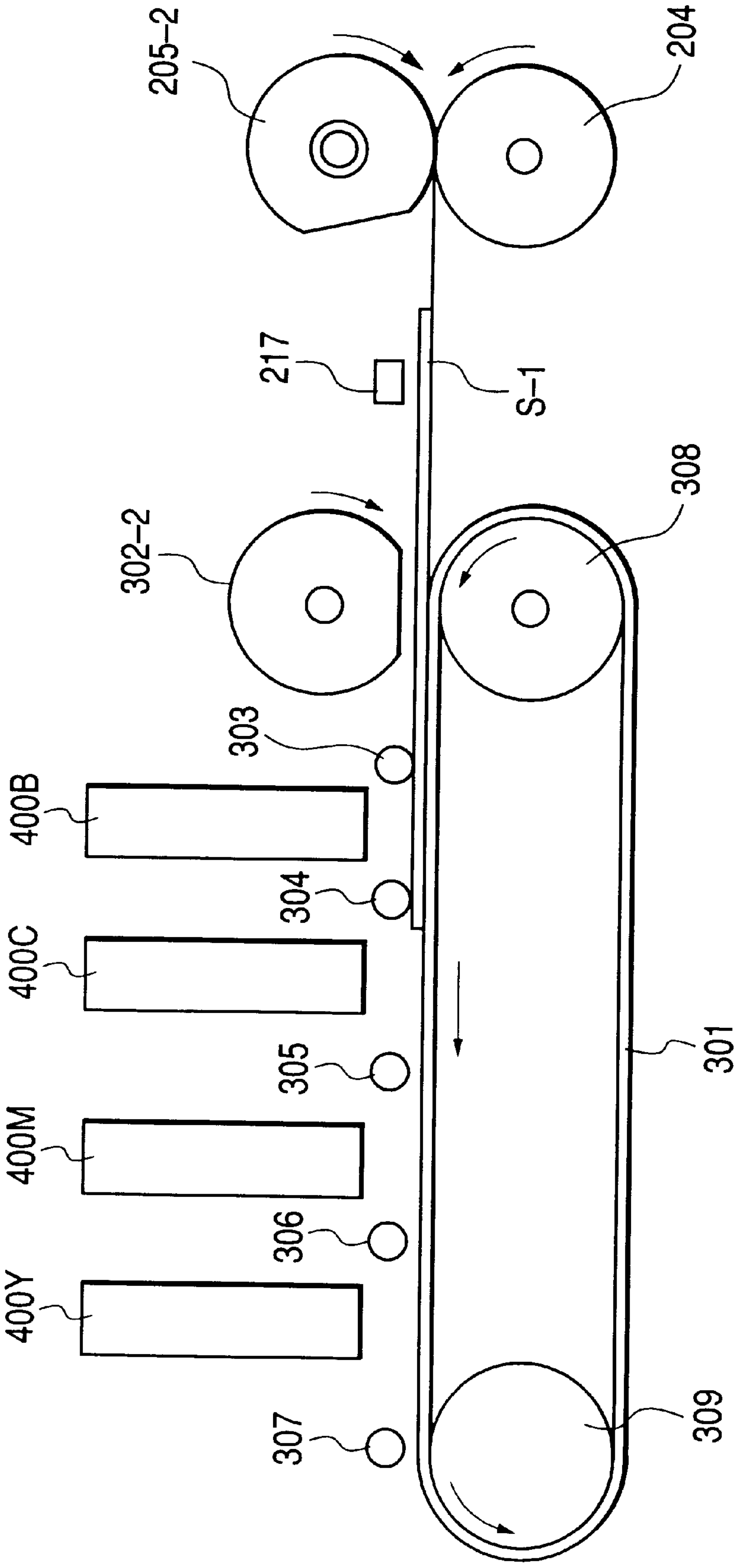

FIG. 8 shows a condition that the driven roller 302-2 has been rotated by one revolution to return the stand-by condition. In this condition, although the trailing end of the recording medium S-1 is not yet passed through the nip between the convey belt 301 and the driven roller 302-2, since the recording medium pinching condition between the convey belt 301 and the driven roller 302-2 is released, the recording medium S-1 is not subjected to the conveyance resistance from the driven roller 302-2.

As mentioned above, in the recording apparatus according to the present invention, since the recording medium pinching condition of the second recording medium conveying means is released when the recording medium conveyed from the second recording medium conveying means is pinched by the first recording medium conveying means for pinching and conveying the recording medium to the recording portion, the first recording medium conveying means is not subjected to the influence of the second recording medium conveying means via the recording medium.

Further, since the recording medium pinching condition of the first recording medium conveying means is released before the trail end of the recording medium conveyed from the second recording medium conveying means is passed through the pinching portion of the first recording medium conveying means, the recording medium being conveyed by the first recording medium conveying means is not subjected to the conveyance resistance from the pinching portion.

Thus, the recording medium being conveyed by the first recording medium conveying means is stably conveyed at the predetermined speed.

What is claimed is:

1. A recording apparatus comprising:

first recording medium conveying means for conveying a recording medium received in a pinched condition to a recording portion in a born condition; and second recording medium conveying means for conveying the recording medium to said first recording medium conveying means in a pinched condition;

wherein, when a leading end of the recording medium being conveyed by said second recording medium conveying means is passed through a pinching portion of said first recording medium conveying means, a recording medium pinching condition of said second recording medium conveying means is released, and wherein a recording medium pinching condition of said first recording medium conveying means is released before a trailing end of the recording medium being conveyed by said first recording medium conveying means is passed through said pinching portion.

2. A recording apparatus according to claim 1, wherein said second recording medium conveying means includes a pair of rollers, and the recording medium pinching condition of said second recording medium conveying means is released by disengaging one of said rollers from the other.

3. A recording apparatus according to claim 2, wherein recording medium detecting means for detecting the recording medium is disposed downstream of said pinching portion of said first recording medium conveying means, and, when the leading end of the recording medium being conveyed by said second recording medium conveying means is detected by said recording medium detecting means, one of said rollers of said second recording medium conveying means is disengaged from the other.

4. A recording apparatus according to claim 1, wherein said second recording medium conveying means comprises a pair of rollers, at least one of said pair of rollers being a semi-circular roller having a flat portion at a portion of a periphery thereof, and the recording medium pinching condition of said second recording medium conveying means is released by stopping said semi-circular roller at a position where the flat portion becomes parallel with the recording medium.

5. A recording apparatus according to claim 4, wherein a driving force is transmitted to said semicircular roller through a one revolution clutch.

6. A recording apparatus according to claim 1, wherein said first recording medium conveying means includes an endless belt, said pinching portion is defined by said belt and a roller contacted with said belt, and the recording medium pinching condition of said first recording medium conveying means is released by disengaging said roller from said belt.

7. A recording apparatus according to claim 6, wherein recording medium detecting means for detecting the recording medium is disposed between said first recording medium conveying means and said second recording medium conveying means, and, when the trailing end of the recording medium conveyed to said second recording medium conveying means is detected by said recording medium detecting means, said roller of said pinching portion is disengaged from said belt.

8. A recording apparatus according to claim 1, wherein said first recording medium conveying means includes an endless belt, said pinching portion is defined by said belt and a semi-circular roller having a flat portion at a portion of a periphery thereof and contacted with said belt, and the recording medium pinching condition of said first recording medium conveying means is released by stopping said semi-circular roller at a position where the flat portion becomes parallel with the recording medium.

9. A recording apparatus according to claim 8, wherein in a driving force is transmitted to said semi-circular roller through a one revolution clutch.

10. A recording apparatus according to claim 9, wherein recording medium detecting means for detecting a recording medium is disposed between said first recording medium conveying means and said second recording medium conveying means, and, when the leading end of the recording medium conveying means is detected by said recording medium detecting means, said one revolution clutch is turned ON.

11. A recording apparatus according to claim 1, wherein said recording portion includes a plurality of ink jet recording heads spaced apart from each other by a predetermined distance along a recording medium conveying direction.

* * * * *

UNITED STATES PATENT AND TRADEMARK OFFICE

CERTIFICATE OF CORRECTION

PATENT NO. : 6,137,600

DATED : October 24, 2000

INVENTOR(S): KENJI SAKURAI, ET AL.

It is certified that error appears in the above-identified patent and that said Letters Patent is hereby corrected as shown below:

COVER PAGE AT ITEM [73]:
Assignee: "Tokyo," should read --Mitsukaido,--.

COLUMN 1:
Line 47, "a" should be deleted.
Line 48, "of" (1st occurrence) should be deleted.
Line 65, "of" (2nd occurrence) should be deleted.

COLUMN 2:
Line 28, "an" should read --a--.

COLUMN 6:
Line 46, "return" should read --return to--.

COLUMN 7:
Line 15, "condition;" should read --condition,--.

UNITED STATES PATENT AND TRADEMARK OFFICE
CERTIFICATE OF CORRECTION

PATENT NO. : 6,137,600

DATED : October 24, 2000

INVENTOR(S): KENJI SAKURAI, ET AL.

It is certified that error appears in the above-identified patent and that said Letters Patent is hereby corrected as shown below:

COLUMN 8:
Line 30, "in" should be deleted.

Signed and Sealed this

First Day of May, 2001

Attest:

Nicholas P. Godici

NICHOLAS P. GODICI

*Attesting Officer* *Acting Director of the United States Patent and Trademark Office*